United States Patent [19]

Chiarot et al.

[11] Patent Number: 5,390,312
[45] Date of Patent: Feb. 14, 1995

[54] ACCESS LOOK-ASIDE FACILITY

[75] Inventors: Kevin A. Chiarot, Poughkeepsie; Robert M. Dinkjian, Woodstock; Theodore J. Schmitt, Kingston, all of N.Y.

[73] Assignee: International Business Machines Corporation, Armonk, N.Y.

[21] Appl. No.: 216,784

[22] Filed: Mar. 23, 1994

Related U.S. Application Data

[63] Continuation of Ser. No. 764,577, Sep. 24, 1991, abandoned.

[51] Int. Cl.⁶ .............. G06F 12/00; G06F 12/10; G06F 12/16; G06F 9/34
[52] U.S. Cl. .............. 395/400; 395/425; 364/243.41; 364/255.1; 364/255.3; 364/256.3; 364/256.4; 364/DIG. 1
[58] Field of Search .............. 395/400, 425

[56] References Cited

U.S. PATENT DOCUMENTS

| | | | |
|---|---|---|---|
| 4,355,355 | 10/1982 | Butwell et al. | 395/400 |
| 4,521,846 | 6/1985 | Scalzi et al. | 395/425 |
| 4,849,881 | 7/1989 | Eguchi | 395/425 |
| 4,945,480 | 7/1990 | Clark et al. | 395/700 |
| 4,979,098 | 12/1990 | Baum et al. | 395/400 |
| 5,008,811 | 4/1991 | Scalzi et al. | 395/400 |
| 5,023,773 | 6/1991 | Baum et al. | 395/400 X |
| 5,210,840 | 5/1993 | Fukagawa | 395/400 |
| 5,220,669 | 6/1993 | Baum et al. | 395/775 |

OTHER PUBLICATIONS

Scalzi et al. *Enterprise Systems Architecture/370: An architecture for multiple virtual space access and authorization*, IBM System Journal, vol. 28, No. 1, 1989.

*Primary Examiner*—Jack B. Harvey
*Assistant Examiner*—Michael A. Whitfield
*Attorney, Agent, or Firm*—Lynn L. Augspurger

[57] ABSTRACT

An Access List Entry Token (ALET) access look-aside facility is used to look at all entries in the access Look-Aside Buffer (ALB) and select a Segment Table Destination (STD) for use in Dynamic Address Translation (DAT). At the same time that address generation is done to form the virtual address used for DAT, the content of the access register (i.e., the ALET) to be used for the access is sent to the ALB. When the AR-specified STD is to be used for DAT, the ALET sent to the ALB is simultaneously compared with all the ALETs in the ALB. If the ALET compares with an ALET in an ALB entry, the STD associated with that entry is selected for use in the storage access.

8 Claims, 3 Drawing Sheets

NE — NOT EQUAL

ACCESS LOOK-ASIDE FACILITY

CROSS-REFERENCE TO RELATED APPLICATION

This application is a continuation of application Ser. No. 07/764,577, filed Sep. 24, 1991, now abandoned.

BACKGROUND OF THE INVENTION

1. Field of the Invention

The present invention generally relates to virtual address translation mechanism for data processing systems and, more particularly, to an access look-aside facility which provides a significant performance benefit for storage accesses. The environment of the invention is a data processing system in which a program or programs being executed on the data processing system have concurrent access to multiple virtual address spaces. In such a system, access registers corresponding to general purpose registers contain tokens, referred to as Access List Entry Tokens or ALETs, are used to specify an access list entry for obtaining a segment table designation in a translation process. The use of ALETs allows system control of address spaces to be isolated from program control access registers. The invention is a specific improvement to the systems disclosed in U.S. Pat. No. 4,355,355 to Butwel et al. and U.S. Pat. No. 4,979,098 to Baum et al.

2. Description of the Prior Art

Virtual storage organization and management for data processing systems are described, for example, by Harvey M. Deitel in *An Introduction to Operating Systems*, Addison-Wesley (1984), by Harold Lorin and Harvey M. Deitel in Operating Systems, Addison-Wesley (1981), and by Harold S. Stone in High-Performance Computer Architecture, Addison-Wesley (1987). In a virtual storage system, paging is a relocation and address-to-physical-location binding mechanism providing the user of the system with what appear to be considerably larger memory spaces than are really available. The key feature of the virtual storage concept is disassociating the addresses referenced in a running process from the addresses available in main storage. The addresses referenced by the running process are called virtual addresses, while the addresses available in main storage are called read addresses. The virtual addresses must be mapped into real addresses as the process executes, and that is the function of the dynamic address translation (DAT) mechanism. One such mechanism employs a directory look-aside table (DLAT), sometimes referred to as a translation look-aside buffer (TLB), which stores recent virtual address translation. For virtual addresses stored in the DLAT, the translation process requires only a single or, at most, a couple of machine cycles. For addresses not stored in the DLAT, the DAT process may take from fifteen to sixty cycles.

Translations from the virtual address to the real address must be made to find where the addressed instruction or data is in main storage. This is typically done on a page basis. In fact, the translations stored in the DLAT are actually only page translations, and the last bits of an address are the location in that page, so only the page address must be translated.

U.S. Pat. No. 4,355,355 to Butwell et al. discloses an address generating mechanism for multiple virtual spaces wherein in access registers (ARs) are associated with the general purpose registers (GPRs) in a data processor. The ARs are each loaded with a unique Segment Table Descriptor (STD) which comprises a segment table address in main storage and a segment table length field. In the embodiment disclosed, there are fifteen ARs associated with fifteen GPRs to define a subset of up to fifteen data address spaces. The Butwell et al. invention requires that the STD be in the AR, and therefore, as a practical matter, the number of STDs available to the DATA hardware is limited (e.g., fifteen in the case of the embodiment disclosed).

U.S. Pat. No. 4,979,098 to Baum et al. disclosed an architecture embodying the use of multiple address spaces. The Baum et al. invention is an improvement of the invention described in the Butwell et al. patent. More particularly, Baum et al. describe an Access Register Translation (ART) process wherein the results of the ART process are stored in an ART Look-aside Buffer (ALB) for later use. Baum et al. describe Control Registers CR2, CR5 and CR8 (the "DSI CRs" of the Butwell et al. patent) and how they affect the ALB.

SUMMARY OF THE INVENTION

It is therefore an object of the present invention to provide an improved virtual address translation mechanism for a data processing system which allows access to multiple data spaces with no additional cycles added to the DAT.

It is another object of the invention to provide an access look-aside facility in a virtual address data processing system that improves performance of storage accesses by eliminating overhead and maintenance required in prior systems.

According to the invention, an Access Look-aside Facility (ALF) is provided which performs a simultaneous comparison at the time of the storage access of all entries in an Access Look-aside Buffer (ALB) with the contents of the Access Register (AR) specified at the operand AR without adding cycles to the Dynamic Address Translation (DAT) in order to obtain an AR-specified Segment Table Designation (STD). In addition, no cycles are added to Access Register Translation to maintain the ALB. The ALF is used on each storage access to an AR-specified address space. At the same time that the address generation is done to form the virtual address used for DAT, the contents of the AR (i.e., an Access List Entry Token or ALET) to be used for the access are sent to the ALB. In addition, two bits indicating the translation mode or space mode (primary, secondary, access register, or home) for the access are sent to the ALB. When the space mode bits along with the instruction fetch line indicate that an AR-specified STD is to be used for DAT, the ALET sent to the ALB is simultaneously compared with all the ALETs in the ALB, including implied entries for ALET=0 and ALET=1. If the ALET compares with "0" or "1", the Primary STD (Control Register CR1) or the Secondary STD (Control Register CR7), respectively, is selected. If the ALET compares with an ALET in ALB entry and the matched entry is valid, the STD associated with the entry is selected for use in the storage access.

An ALB hit is said to have occurred when an STD is selected. When a hit occurs, the STD is available to the storage access hardware in the same cycle an STD is available for accesses to non-AR-specified address spaces. When no hit occurs, the storage access hardware interrupts the Central Processor (CP) microcode which does Access Register Translation. The ALB is made up of entries which consist of ALETs and STDs. Two entries with implied ALETs always equal "0" and "1" correspond to the Primary STD and the Secondary STD. Any number of entries may be implemented in the ALB, as required. All valid entries in the ALB are used for the look-up. An entry is invalid when the valid bit for the entry is "0". A PURGE ALB command is provided to reset the valid bit in all entries in one cycle. This command is issued by microcode as required. The valid bits are also reset when Control Registers CR2, CR5 and CR8 change. The entries with implied ALET values are considered always valid. The ALB is loaded at the completion of Access Register Translation via microcode control.

In contrast to the address generating mechanism disclosed in the Butwell et al. U.S. Pat. No. 4,355,355, the present invention disassociates the Access Registers (ARs) from the STDs. The ALB has entries containing access list entry tokens as well as an associated STD. The Butwell et al. patent refers to STDs as Address Space Identifiers (ASIs) (ref. col. 14, line 35). In the Butwell et al. patent, the ARs contain ASIs. The subject invention, like the Butwell et al. invention, selects an AR as part of the address generation process; however, this invention passes the ALET contained in the AR to a STD selection mechanism and performs comparison with the ALETs already associated with STDs in the ALB. Any number of entries may be in the ALB.

The subject invention eliminates the overhead and maintenance of the AR/ARCV, including the need for a special "Load AR/ARCV" instruction (FIG. 3 of the Butwell et al. patent) and the need to preload ARs with previously translated STDs from a "data space inventory" (DSI). The subject invention performs an AR translation. No additional cycles are added to the AR translation process to maintain the ALB. In the Butwell et al. invention, the AR translation must occur prior to attempting to access the data space so that an entry may be made in the DSI.

The Butwell et al. invention also uses a DSI CR to "prevent accessing by either the load AR/ARCV or store AR/ARCV instructions outside the specified DSI" (ref. col. 5, lines 35–55). Additional overhead is required to ensure that invalid entries are not used. In the subject invention, all entries in the ALB are invalidated in the ALB in a single cycle any time a DSI CR changes. The ALB begins to be rebuilt with new entries as new accesses are made following such a change using the new DSI CRs. The ALB may also be purged under microcode control in a single cycle.

The subject invention is a specific implementation of the architecture disclosed in the Baum et al. U.S. Pat. No. 4,979,098 incorporated herein by reference. Specifically, the invention uses an ALB like that of the ALB shown in FIG. 24 of the Baum et al. patent but with the addition of a valid bit. The way in which the subject invention implements the architecture of the Baum et al. architecture and the ALB results in no cycles being added to the DAT process, assuming an ALB hit. While there are many possible implementations of the ALB described in the Baum et al. patent, all previous such implementations have required minimally several cycles be added to the DAT process to do the STD selection. The present invention additionally reduces the overhead required to maintain the ALB to a single cycle, by resetting the valid bit. In the past, this has also typically taken several cycles.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention is specifically directed to virtual addressing in multiple virtual address spaces in data processing systems, such as the IBM System/370 systems using the Multiple Virtual Storage (MVS) Operating System (OS). That is the environment of the inventions described in the patents to Butwell et al. and Baum et al. described above, and reference should be had to those patents for a detailed explanation of that particular environment. See also the article by C. A. Scalzi et al. entitled "Enterprise Systems Architecture/370: An architecture for multiple virtual space access and authorization" published in IBM Systems Journal, vol. 28, no. 1, 1989, for additional background of this environment. One skilled in the art of multiple virtual space access architecture would be familiar with IBM's System/370 architecture and MVS/OS.

Figure 1:
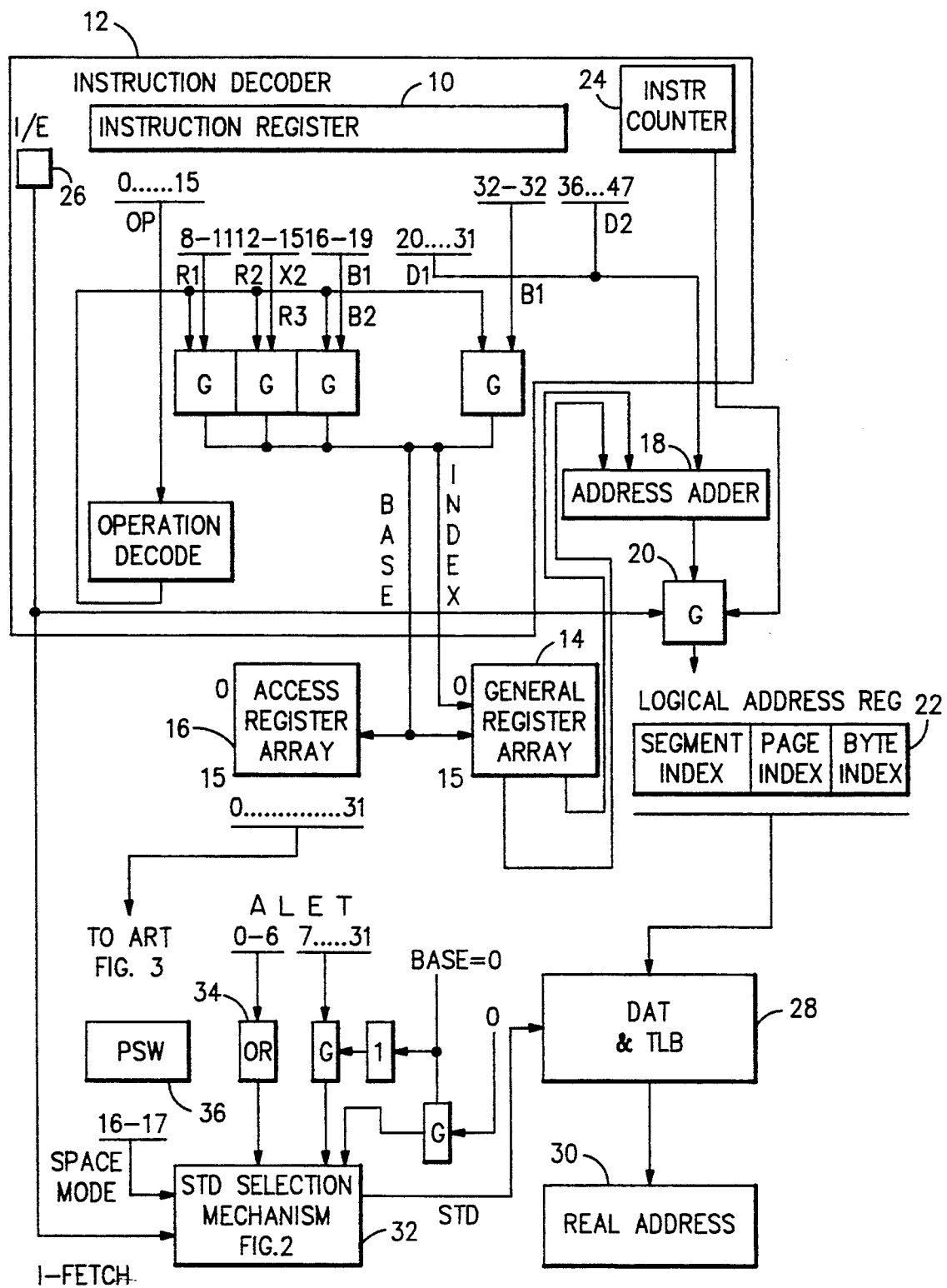
FIG. 1 is a block diagram of ALET Access Look-aside Facility according to the preferred embodiment of the invention.

Referring now to the drawings, and more particularly to FIG. 1, there is shown in block diagram form the ALET Look-aside Facility according to the preferred embodiment of the invention. A virtual address in register 10 is decoded in instruction decoder 12. The decoder 12 is conventional and is used to identify a BASE and an INDEX for an instruction in register 10. The BASE selects a general purpose register (GPR) from the general register array 14 and an access register (AR) from the access register array 16. In the example illustrated, there are sixteen each of the GPRs 14 and ARs 16 which are addressed by a 4-bit BASE address. The INDEX from the instruction decoder 12 selects a GPR from the general register array 14. The contents of the two addressed GPRs are sent to the address adder 18 along with the displacement (D1 bits 20–31 and D2 bits 36–47) to generate the logical address which is passed by gate 20 into logical address register 22. Gate 20 is enabled by instruction counter 24 and the Instruction-Fetch (I-Fetch) bit 26. The logical address in register 22 provides an input to the conventional Dynamic Address Translation (DAT) hardware 28, including a translation look-aside hardware 28, including a translation look-aside buffer (TLB). The output of the DAT hardware 28 is stored in real address register 30.

At the same time the logical address is being generated and sent to the DATA hardware 28, the ALET contained in the AR selected by the BASE is sent to the STD selection mechanism 32 where an STD is selected and sent to the DAT hardware 28. The ALET bits 0–6 are ORed together in OR gate 34 and the result is sent to the STD selection mechanism 32. This is done to reduce the number of bits being sent to the STD selection mechanism 32 and to reduce the number bits which have to be compared to make the STD selection. The ESA/370 architecture currently requires that these bits must be zero for the ALET to be valid.

The I-fetch line 26 from the decoder 12 is also sent to the STD selection mechanism 32 along with the space mode bits 16-17 from the Program Status Word (PSW) 36 to be used in the STD selection process. If the BASE is zero (indicating that AR0 would be selected), an ALET of "0" is sent to the selection mechanism 32 rather than the contents of access register AR0. The ALET from the selected access register is also provided to the access register translation (ART) process, shown in FIG. 3, should an access register translation be necessary.

Figure 2:
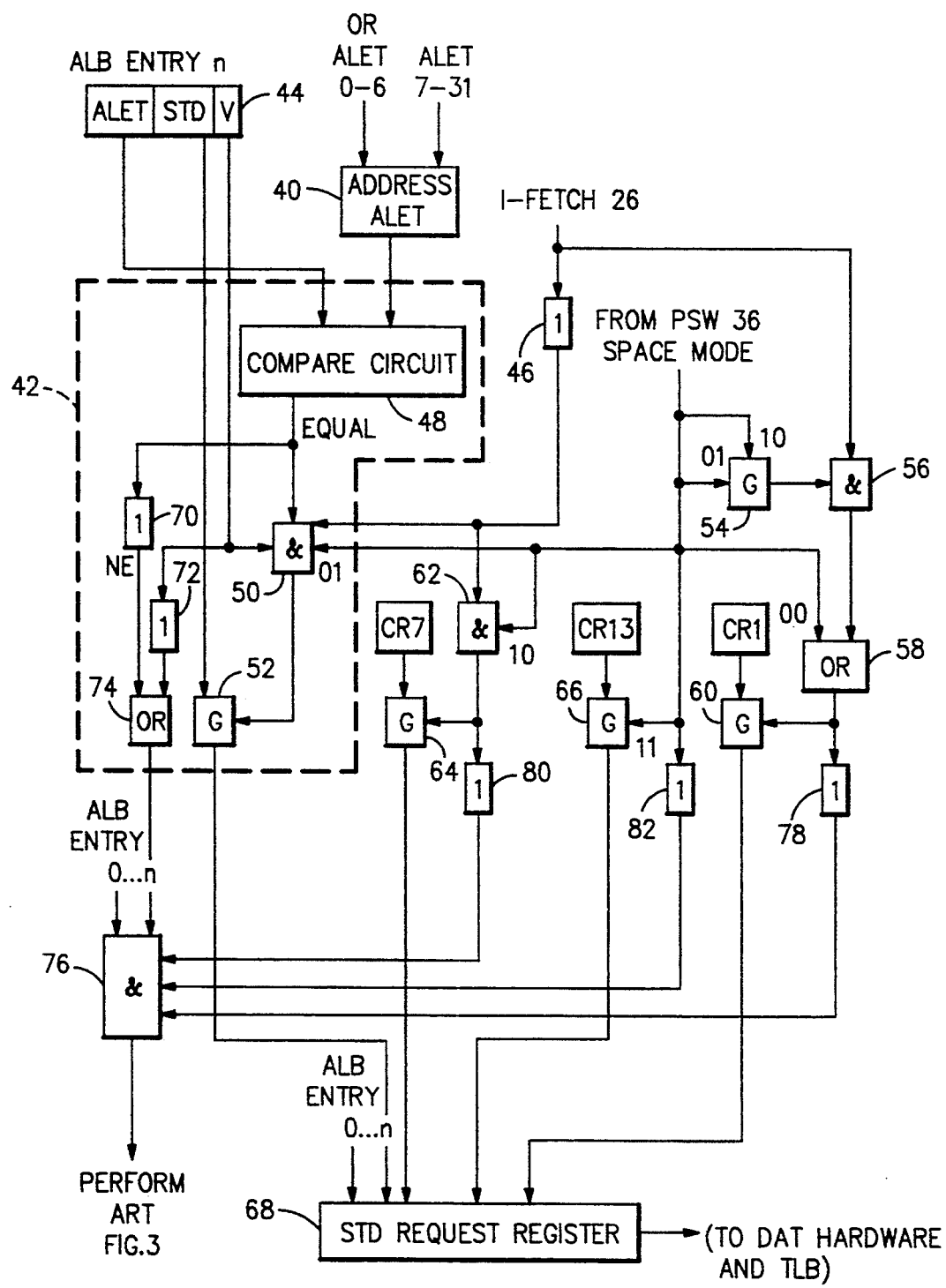
FIG. 2 is a block diagram of the STD selection mechanism used in the ALET Access Look-aside Facility shown in FIG. 1.

The STD selection mechanism 32 is shown in FIG. 2, to which reference is now made. Only one STD is selected for any given set of inputs 40 comprising the ORed ALET bits 0-6 and the ALET bits 7-31 sent from the access register array 16, shown in FIG. 1. The logic in the dotted box 42 is the AR STD selection hardware and is duplicated once for each entry in the ALB. Each instance of the AR STD selection hardware 42 receives a different ALB entry 44 as an input along with the inverted I-fetch signal 26 from inverter 46, the space mode bits 16-17 from PSW 36, and the Address ALET 40. The Address ALET is compared in compare circuit 48 to the ALET in the ALB entry 44 (the ALB ALET). When the I-fetch signal is "0" (i.e., not I-fetch), the space mode bits are "01", indicating AR space, and the Address ALET and ALB ALET for a valid entry (V bit) match (an ALB hit), AND gate 50 enables gate 52 to select the STD in the ALB entry 44.

When the I-fetch signal 26 is "1" or the space mode bits 16-17 from PSW 36 indicate one of the other space modes, one of the STDs from Control Registers CR1, CR7 or CR13 is selected. More particularly, the space mode bits are ORed in OR gate 54. If the space mode bits are "10" or "01", the output of OR gate 54 will be a "1". A "1" for the I-fetch signal 26 produces a "1" output from AND gate 56 which is passed by OR gate 58 to enable gate 60 to select Control Register CR1. Control Register CR1 may also be selected by the AR STD selection hardware if the space mode bits are "00". Control Registers CR7 is selected by AND gate 62 if the I-fetch signal 26 is "0" and the space mode bits are "10". AND gate 62 enables gate 64 to select Control Register CR7. No AR STD selection hardware (i.e., logic) is provided for the ALB entry containing Control Register CR13 (entry 2 in FIG. 4); rather, gate 66 is enabled directly to select Control Register CR13 when the space mode bits are "11". Table I shows which STD is selected for a given set of inputs.

TABLE I

| I-Fetch | Space Mode | STD selected |
| --- | --- | --- |
| 0 | 00 | Primary (CR1) STD |
| 0 | 10 | Secondary (CR7) STD |
| 0 | 11 | Home (CR13) STD |
| 0 | --- 01 | Compare of ALETs |
| 1 | 00 | Primary (CR1) STD |
| 1 | 10 | Primary (CR1) STD |
| 1 | 11 | Home (CR13) STD |
| 1 | 01 | Primary (CR1) STD |

The equations used in the STD selection process are as follows, where SM means space mode:
1) Select Primary STD (CR1)=(I-fetch & SM@=11)+SM=00+(SM=01 & Address ALET=0)
2) Select Secondary STD (CR7)=(@I-fetch & SM=10)+(SM=01 & Address ALET=1)
3) Select Home STD (CR13)=SM=11
4) Select AR STD from ALB entry x=SM=01 & @I-fetch & (Address ALET=ALBx ALET & ALBx V=1)

The selected STD is stored in the STD request register 68 and output to the DATA hardware 28, as shown in FIG. 1.

The output of the compare circuit 48 is inverted by inverter 70. A "1" from inverter 70 indicates a not equal (NE) condition. The valid (V) bit from the ALB entry 44 is also inverted by inverter 72. A "1" from inverter 72 indicates that the ALB entry is not valid. The outputs of inverters 70 and 72 are ORed in OR gate 74 to provide an output from the AR STD selection hardware 42, there being one such output for each ALB entry. The output of OR gate 74 is supplied to AND gate 76. The inputs to gates 60, 64 and 66 are inverted by inverters 78, 80 and 82, respectively, and supplied as inputs to AND gate 76. An output from AND gate 76 indicates that no STD is selected (an ALB miss). If no STD is selected, the access register translation (ART) process shown in FIG. 3 is performed.

Figure 3:
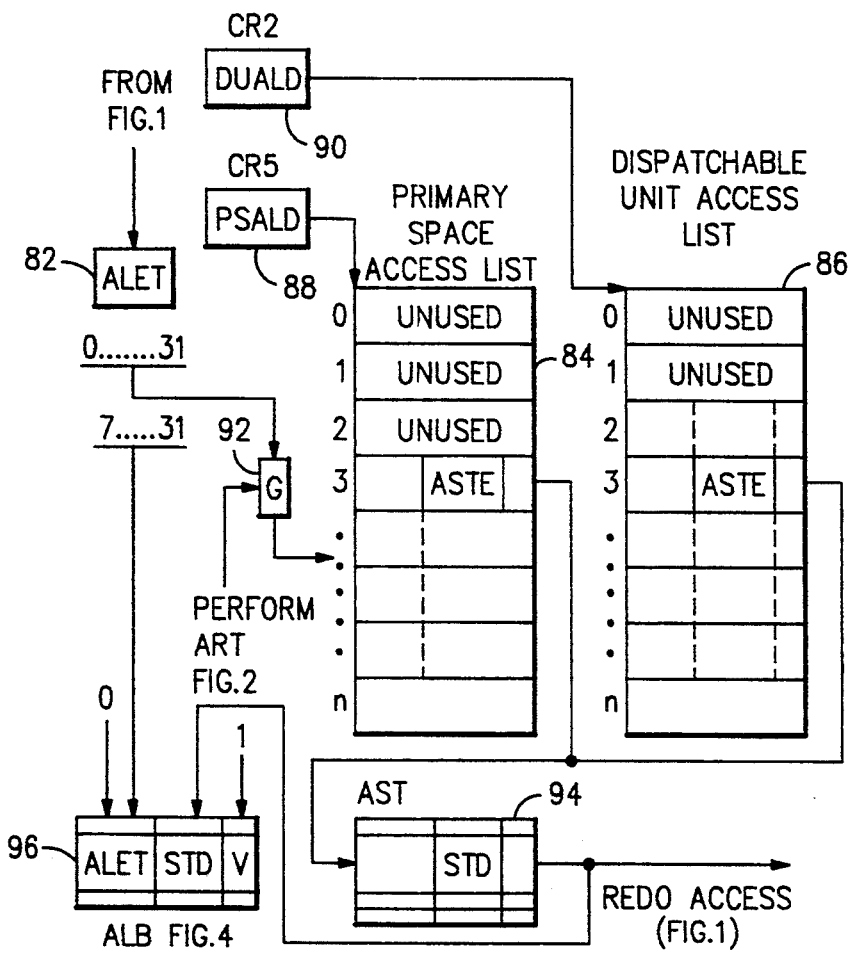
FIG. 3 is a block diagram of the Access Register Translation (ART) process which receives inputs from the ALET Access Look-aside Facility shown in FIG. 1 and the STD selection mechanism shown in FIG. 2.

Reference is now made to FIG. 3 for a description of the Access Register Translation (ART) process. The ALET 82 selected by the BASE from the access register array 16, as shown in FIG. 1, is used to locate an entry in either the Primary Space Access List (PSAL) 84 or the Dispatchable Unit Access List (DUAL) 86. The origin of the PSAL 84 is specified by the Primary Unit Access List Designation (PSALD) 88 of Control Register CR5, while the origin of the DUAL 86 is specified by the Dispatchable Unit Access List Designation (DUALD) 90 of Control Register CR2. A bit in the ALET 83 determines which list is used. ART is performed when a signal is received by gate 92 from the STD selection mechanism shown in FIG. 2 indicating that ART is required.

FIG. 3 is adapted from FIG. 2 of U.S. Pat. No. 4,979,098 to Baum et al. and, like FIG. 2 of Baum et al., provides an overview of the ART process. Each entry in the access lists 84 and 86 includes an ASTE address which points to an Address Space Number (ASN) Second Table Entry (ASTE) which may or may not be in the ASN Second Table (AST) 94. Each ASTE includes an STD value, and this value is read out of the AST 94 to the ALB 96.

Upon successful completion of ART, the ALB 96 is updated with a new entry containing bits 7-31 of the ALET 82 used for ART and the STD located by the translation. A zero is also placed in the bit to be compared with the ORed bit provided as input to the STD selection mechanism shown in FIG. 2. The valid (V) bit is also set for the entry. Also, upon completion of ART, the instruction decode is performed again, and the entire process described previously is redone, as indicated in the lower right corner of FIG. 3. However, the STD selection will result in an ALB hit this time.

A Least Recently Used (LRU) algorithm is used to decide which entry to replace in the ALB 96. The algorithm pairs the entries and uses two bits for each pair to determine which entry is the least recently used. One bit identifies the pair as the LRU pair. The other bit identifies the entry within the pair. The following example shows the algorithm given a six entry ALB. This example can be extended as necessary for however many entries are actually in the ALB. More specifically, the 0/1 pair of entries is denoted as "a", the 2/3 pair of entries is denoted as "b", and the 4/5 pair of entries is denoted as "c". When the first bit representing a pair is a=0, b=x, c=1, then replace a, but when a=1, b=0, c=x, then replace b, but when a=x, b=1, c=0, then replace c, where "x" means a "don't care" condition. When a hit occurs in the ALB, pair bits a, b and c are updated as follows:

```
                hit a: _ a=1, b=u,
   c=0,
                hit b: _ a=0, b=1,
   c=u, and
                hit c: _ a=u, b=0,
   c=1,
``` where "u" indicates that the bit remains unchanged. Within a pair, the second bit is flipped, as necessary, to indicate which entry is the least recently used. When the bit is "0", the first entry of the pair is replaced. When the bit is "1", the second entry is replaced.

Figure 4:
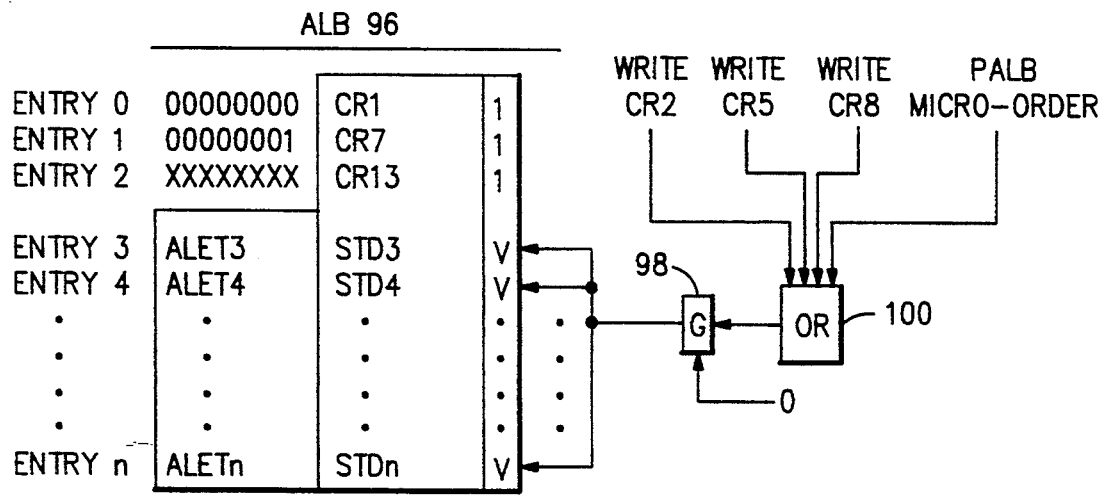
FIG. 4 is a block diagram of the Access Look-aside Buffer (ALB) used in the ART process shown in FIG. 3.

FIG. 4 shows the structure of the ALB 96. The first three entries contain the Control Register (CR) STDs which are always valid. The remaining entries are built as described above. The valid bits for entries 3 through n are reset to "0" by gate 98 whenever any of Control Registers CR2, CR5 or CR8 are written, as determined by OR gate 100. Control Register CR8 contains the Extended Authority Index (EAX) which must match the EAX in the translation tables used during ART before an entry is made in the ALB 96. Execution of a PURGE ALB (PALB) instruction will also cause the valid bits to be reset to "0". All valid bits are reset simultaneously whenever the gating conditions are met.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A virtual address translation control system in a data processing system having a central processor with a predetermined number of general purpose registers, said central processor executing instructions, the instructions having one or more operands each specifying an effective logical address by address components included in a base general purpose register, a non-base general purpose register and a displacement field of an instruction, said control system selecting one of plural address translation tables to generate an address space identifier to be used for translating a virtual address of an operand of an instruction being executed by said central processor to a real address for locating the operand in a main storage of said data processing system, said control system comprising:

decoding means in the central processor for decoding a general purpose register address in an instruction and signalling whether a general purpose register designation in an instruction is a base general purpose register address or a non-base general purpose register address;

a plurality of access registers being respectively associated with said predetermined number of general purpose registers, each access register being loadable with an access list entry token, said access list entry token being applied to one of said plural address translation tables to provide an address space identifier;

storing means for storing said access list entry token, a corresponding address space identifier and a valid bit together, said valid bit indicating a valid or invalid state of said address space identifier;

said storing means storing a plurality of entries, at least some of said entries incorporating implied entries instead of said access list entry tokens, said implied entries always being valid and containing said control register address spaces;

selecting means for selecting an address space identifier from said storing means, with the base general purpose register address provided by the decoding means;

said selecting means including means for simultaneously comparing each subsequent access list entry token with all previously stored access list entry tokens in parallel in one processor cycle and if a match is found, and the valid bit indicates the corresponding address space identifier is valid, said selecting means generating the address space identifier without checking the address translation tables, but if no match is found, or the valid bit indicates the corresponding space identifier is invalid, said selecting means generating a signal to perform an access register translation using said address translation tables;

said selecting means further including access register address space identifier selection logic for each entry in said storing means, each instance of said selection logic receiving a different entry from said storing means, space mode bits from a program status word and an address access list entry token, said selecting means generating the address space identifier for a corresponding entry in storing means;

said space mode bits may indicate space modes other than access register space mode, further including a plurality of control registers storing primary, secondary, and home-specified address spaces, and gating means responsive to said space mode bits for selecting the contents of one of said control registers as the address space identifier for said virtual address translation means;

means responsive to said signal for performing an address translation table check to generate an address space identifier and storing said address space identifier in said storing means;

virtual address translation means receiving an effective logical storage operand address and an address space identifier from said storing means selected by the selecting means to translate the effective logical storage operand address to a real address in the main storage of the data processing system, said plural access registers containing different access list entry tokens enabling the data processing system to concurrently access plural address spaces, and said address space identifier associated with an access register arriving at said virtual address translation means at the same time as an address space identifier associated with a control register of said data processing system;

means for clearing in a single cycle all entries except said implied entries in said storing means in response to a change in selected ones of said control registers, said entries being cleared by resetting the valid bits for each of said entries.

2. The virtual address translation control system recited in claim 1 wherein said clearing means also responds to a microcode purge instruction to reset the valid bits for each of said entries.

3. The virtual address translation control system recited in claim 1 further comprising means for replacing a least recently used entry in said storing means when an address space identifier is stored in said storing means.

4. The virtual address translation control system recited in claim 1 wherein said signal to perform an access register translation is generated only when necessary due to no match being found for the compared access list entry tokens, or when the valid bit indicates that the address space identifier is invalid.

5. In a data processing system having a central processor with a predetermined number of general purpose registers, said central processor executing instructions, the instructions having one or more operands each specifying an effective logical address by address components included in a base general purpose register, a non-base general purpose register and a displacement field of an instruction, a virtual address translation control method useful in selecting one of plural address translation tables to generate an address space identifier to be used for translating a virtual address of an operand of an instruction being executed by said central processor to a real address for locating the operand in a main storage of said data processing system, comprising the steps of:

decoding, via decoding means in the central processor, a general purpose register address in an instruction and signalling whether a general purpose register designation in an instruction is a base general purpose register address or a non-base general purpose register address;

associating a plurality of access registers respectively with said predetermined number of general purpose registers, each access register being loadable with an access list entry token, applying said access list entry token to one of said plural address translation tables to provide an address space identifier;

storing said access list entry token, a corresponding address space identifier and a valid bit together in a storing means, said valid bit indicating a valid or invalid state of said address space identifier;

said storing means storing a plurality of entries, at least some of said entries incorporating implied entries instead of said access list entry tokens, said implied entries always being valid and containing said control register address spaces;

selecting an address space identifier from said storing means, with the base general purpose register address provided by the decoding means, by simultaneously comparing each subsequent access list entry token with all previously stored access list entry tokens in parallel in one processor cycle and if a match is_found, and the valid bit indicates the corresponding address space identifier is valid, generating the address space identifier without checking the address translation tables, but if no match is found, or the valid bit indicates the corresponding space identifier is invalid, generating a signal to perform an access register translation using said address translation tables; wherein access register address space identifier selection logic is provided for each entry in said storing means, each instance of said selection logic receiving a different entry from said storing means, space mode bits from a program status word and an address space list entry token, and the address space identifier is generated by selecting the address space identifier for a corresponding entry in said storing means;

said space mode bits may indicate space modes other than access register space mode, further including the steps of storing primary, secondary, and home specified address spaces in a plurality of control registers and selecting in response to said space mode bits the contents of one of said control registers as the address space identifier for said virtual address translation method;

generating in response to said signal for performing an access register translation an address space identifier and storing said address space identifier in said storing means;

receiving at a virtual address translation means an effective logical storage operand address and an address space identifier from said storing means selected to translate the effective logical storage operand address to a real address in the main storage of the data processing system, said plural access registers containing different access list entry tokens enabling the data processing system to concurrently access plural address spaces, and said address space identifier associated with an access register arriving at said virtual address translation means at the same time as an address space identifier associated with a control register of said data processing system;

clearing in a single cycle all entries except said implied entries in said storing means in response to a change in selected ones of said control registers, said entries being cleared by resetting the valid bits for each of said entries.

6. A virtual address translation control method according to claim 5 wherein said clearing is also performed in response to a microcode purge instruction to reset the valid bits for each of said entries.

7. A virtual address translation control method according to claim 5 further comprising the step of replacing a least recently used entry in said storing means when an address space identifier is stored in said storing means.

8. A virtual address translation control method according to claim 5 wherein said signal to perform an access register translation is generated only when necessary due to no match being found for the compared access list entry tokens, or when the valid bit indicates that the address space identifier is invalid.

* * * * *